United States Patent [19]

Koschinat et al.

[11] Patent Number: 4,890,823
[45] Date of Patent: Jan. 2, 1990

[54] PLUNGER PISTON SYSTEM WITH SEPARATE PLASTIC PLUNGER PISTON AND SUPPORTING MEMBER

[75] Inventors: B. Hubert Koschinat, Hösbach-Winzenhohl; Manfred Fröhlke, Ottweiler, both of Fed. Rep. of Germany

[73] Assignee: Otto Sauer Achsenfabrik Keilberg, Bessenbach-Keilberg, Fed. Rep. of Germany

[21] Appl. No.: 242,412

[22] Filed: Sep. 9, 1988

[30] Foreign Application Priority Data

Jul. 20, 1988 [DE] Fed. Rep. of Germany ....... 3824542

[51] Int. Cl.⁴ ............................ F16F 9/04; B25G 3/00
[52] U.S. Cl. ................................... 267/64.27; 403/377
[58] Field of Search ............... 267/64.27, 64.24, 64.23, 267/64.19, 64.21, 35, 124, 122; 92/98 D, 90, 99, 255; 403/377 X; 280/711–713

[56] References Cited

U.S. PATENT DOCUMENTS

| | | | |
|---|---|---|---|
| 4,506,910 | 3/1985 | Bierens | 267/64.27 X |
| 4,784,376 | 11/1988 | Ecktman | 267/64.27 |
| 4,787,606 | 11/1988 | Geno et al. | 267/64.27 |

FOREIGN PATENT DOCUMENTS

| | | | |
|---|---|---|---|
| 2311670 | 12/1976 | France | 267/64.19 |
| 0839745 | 6/1981 | U.S.S.R. | 267/64.23 |
| 1231766 | 5/1971 | United Kingdom | 267/64.27 |

Primary Examiner—Robert J. Oberleitner
Attorney, Agent, or Firm—Wenderoth, Lind & Ponack

[57] ABSTRACT

The invention relates to a plunger piston system made preferably of glass fiber-reinforced plastic or similar composite material to support and guide the pneumatic spring bellows of an air suspension axle of a commercial vehicle or the like, with a plunger piston, which has an essentially cylindrical plunger piston skirt with a bottom foot region for the connection with an air spring bearing arm and an upper, preferably essentially semi-circular plunger piston edge, which adjoins the plunger piston skirt and which transforms preferably at an angle from the outside inwardly into a trough section that is equipped with a preferably, in any event region by region, essentially level trough base, having an opening for the passage of a bolt for a friction lock connection with a base of the air spring bellows, and that preferably forms a truncated conical trough for preferably form-locked reception of the convex base of the air spring bellow, whereby to simplify the production and yet improve the stability a supporting member designed as a separate component is mounted in the cavity surrounded by the essentially cylindrical plunger piston shell, the supporting member abutting with an upper base plate the under side of the trough base of the plunger piston, and the plunger piston and supporting member abut in their bottom foot region at least at several points distributed over the perimeter of the foot regions.

21 Claims, 2 Drawing Sheets

PLUNGER PISTON SYSTEM WITH SEPARATE PLASTIC PLUNGER PISTON AND SUPPORTING MEMBER

The invention relates to a plunger piston system made preferably of glass fiber-reinforced plastic or similar composite material to support and guide the pneumatic spring bellows of an air suspension axle of a commercial vehicle or the like, with a plunger piston, which has an essentially cylindrical plunger piston skirt with a bottom foot region for the connection with an air spring bearing arm and an upper, preferably essentially semicircular plunger piston edge, which adjoins the plunger piston skirt and which transforms preferably at an angle from the outside inwardly into a trough section that is equipped with a preferably, in any event region by region, essentially level trough base, having an opening for the passage of a bolt for a friction lock connection with a base of the air spring bellows, and that preferably forms a truncated conical trough for preferably form-locked reception of the convex base of the air spring bellow.

Commercial vehicles are being equipped more frequently with air spring systems to increase the spring comfort, to take advantage of the ride height adjustment and control device, to distribute optimally the axle loads by means of compensation lines in multiple bogies and to preserve the surface of the road. Pneumatic spring axles within multiple bogies can be lifted in a simple manner by means of auxilliary devices for the purpose of conserving the tires.

Pneumatic springs can transfer only vertical forces. To absorb all other forces and moments other chassis elements are also required. The known air suspensions comprise primarily an air spring bellow, frequently with an integrated rubber buffer as stop, a plunger piston and a bearing arm, which is mounted from its side or under the vehicle axle. The air spring bellows are generally a rotationally symmetrical rubber sack that can be filled with air and that is connected to the vehicle frame by means of a steel plate that is fastened at the top as a force transfer element. A round steel base, which can carry the rubber buffer inside the air spring bellow, is clamped or vulcanized to the bottom side. The convex under side of the base lies friction-locked in a correspondingly concave upper trough of the plunger piston and is securely screwed to said piston.

In its conventional steel design the plunger piston is a rotationally symmetrical deepdrawn or continuous moulded part, whose surface is provided with corrosion protection. Its essentially cylindrical skirt is designed outwardly sightly conically in the lower foot region and then flanged inwardly in the shape of a semi-circle. Holes in the flanged edge enable the connection to the plate-shaped end of the air spring bearing arm. In the upper section the plunger piston skirt transforms from an essentially semi-circular edge into a truncated conical trough with a level base, which serves to receive the convex trough of the air spring bellow. The base of the trough has at least one hole through which a screw bolt can be guided to form a friction lock connection between the plunger piston and the air spring bellow. Under compression, the base of the air-filled spring bellows lies friction-locked in the trough of the plunger piston, whereas the side wall of the essentially cylindrical air spring bellows is slipped over the upper edge of the plunger piston and the essentially cylindrical skirt of the plunger piston. The plunger piston can plunge so deeply into the air spring bellows that the rubber buffer in the air spring bellows is clamped between the upper steel plate and the plunger piston of the air spring bellows and thus forms the end stop. In such cases the shock exerts significant stress directly on the surface of the base of the trough.

Such plunger pistons are relatively heavy and expensive due to their metal design. Furthermore, metal plunger pistons can corrode in the rolling region after long periods of use, and after the corrosion protection has worn off, a situation that can result in increase wear of the rubber sack. Therefore, one has endeavored to develop plunger pistons made of glass fiber-reinforced plastic in order to reduce thus the weight and the cost of production as well as to increase the life of the entire air spring bellows, based on the smooth and non-corrosive surface of the plunger piston. In this model the outer contour of the plunger piston is similar to that of the steel model. However, the edge near the foot is not flanged but rather its cross-section is designed approximately trapezoidal to assure a better application of the supporting arm plate. Vertical to the edge near the foot at most four ribs, at 90° to one another, travel along the inner shell up to the upper edge of the plunger piston. The reinforcing ribs exhibit in their bottom section tapped holes or threaded inserts of metals, which serve to screw the supporting arm plate.

Another model of the plunger piston of glass fiber-reinforced plastic has proposed providing a plurality of reinforcing ribs internally in the region of the upper rounded transistion from the skirt plunger piston to the truncated conical trough. With shock stress, however, at the upper stop, brakes still occur at the transition from the plunger piston skirt to the truncated conical trough. On the other hand, it was also observed that the base of the trough was torn out upon complete rebound, since the effective tensile strength is transferred by means of the screw head and, if desired, a washer from the air spring bellows directly to the trough base of the plunger piston. Besides these functional drawbacks, the plunger piston model attains approximately the weight of the steel plunger piston due to the numerous ribs. Furthermore, the cost of the tools to manufacture such plunger piston models is very high.

In still another model of a plunger piston made of glass fiber-reinforced plastic, a short pipe is moulded in the piston cavity starting from the trough base concentrically; said pipe extended downward to the supporting arm plate and is supported by said plate when subject to stress. The object of this short piece of pipe was to transfer the shocks from the base of the trough to the supporting arm plate and to unstress the edge regions of the plunger piston. However, the drawback of this model is that in the manufacturing process that is used the reinforced glass fibers do not get into the upper third of the short piece of pipe so that the tubular support breaks under higher shock stress. The design of the tubular support also impedes mounting, which is mandatory under some circumstances, the supporting arm plate on a parabolic link, if, instead of the supporting arm said guide is necessary for the construction reasons. Therefore, a region on the bottom edge of the tubular support is subsequently disengaged, thus of course reducing the supporting effect.

Starting from this point, the object of the invention is to develop a plunger piston system of the aforementioned kind made of glass fiber-reinforced plastic or similar composite material, which even in extreme cases absorbs all effective pressure and tensile forces, which occur during compression and rebound of the air suspension axles of the commercial vehicle, without injury, to assure faultless sliding of the air spring bellows in describing the spring excursion, to permit also mounting on a parabolic link and can be manufactured cost-effectively.

This problem is solved by the invention essentially in that in the cavity enclosing the essentially cylindrical plunger piston skirt there is a supporting member that is designed as a separate part and that forms a friction lock between an upper bottom plate preferably at least region-by-region and the bottom side of the trough base of the plunger piston and that the plunger piston and the supporting member in their bottom foot region abut at least at several points distributed over the perimeter of the foot region.

In this manner the previously one-piece plunger piston that was expensive to construct is replaced with a two-piece model, whose two parts assume specific tasks in such a manner that the outer plunger piston essentially assumes the normal guiding of the air spring bellows during compression and rebound, whereas a truncated conical one that is screwed together with the outer plunger piston to the bottom convex air spring bellows plate absorbs essentially the pressure and tensile forces, which can be especially effective upon impact at the top or during complete rebound. Due to the fact that the upper bottom plate of the supporting member forms a friction lock with the under side of the plunger piston base plate, both plates are sufficiently secured due to their sandwich-like configuration with respect to the tensile stress due to sudden complete rebound.

In this construction the outer bottom edge of the supporting member positoned in the cavity of the plunger piston is in the foot region of the plunger piston skirt in order to be able to give radial and axial support to stabilize this edge region. Despite its simple rotationally symmetrical shape and the very simple construction method as compared to prior art models, the solution according to the invention exhibits a much higher serviceability than those of prior art.

To improve the support function even more the supporting member can brace itself with its bottom foot region upward at the bottom foot region of the plunger piston.

Preferably the supporting member is also designed essentially rotationally symmetrical and arranged coaxially to the plunger piston so that the absorption of the forces are distributed uniformly over the perimeter.

To economize on materials and yet effectively absorb the pressure and tensile forces, the supporting member can be designed essentially as a truncated hollow cone having a diameter that decreases from the bottom foot region to the trough base of the plunger piston.

Furthermore, one specific embodiment of the invention provides that the plunger piston has reinforcing ribs that point from the outside inwardly and that are distributed over the perimeter of the plunger piston and in which front-sided depressions to receive bolts are provided for the connection with the air spring carrier and that the supporting member in its foot region connects form-locking at the foot region of the reinforcing ribs.

According to another feature of the invention the supporting member with one, preferably circular stop rib at its bottom foot region can be snapped in in the manner of a snap lock at a minimum in several notched recesses that are distributed over the perimeter of the foot region of the plunger piston skirt. Thus the separate components—plunger piston and supporting member—form a structural and functional unit.

Preferably the notched recesses may be in the foot region of the reinforcing ribs.

With this simple assembly it is possible to achieve the snap-in function if the notched recesses, seen from below, thus from the side from which the supporting member is introduced into the cavity of the piston, are undercut.

Furthermore, the notched recesses can have a lead-in slope to facilitate assembly.

In addition, if the notched recesses form an upper stop edge for the preferably circular stop rib of the supporting member there is greater assurance of the support member bracing itself at the plunger piston.

For the joint assembly of supporting member and plunger piston, for the sake of simplicity the bottom plate of the supporting member can have an opening coaxially to the opening in the trough base of the plunger piston for the passage of the bolt to form a friction joint lock with the base of the air spring bellow.

Another feature of the invention is that the base plate of the supporting member is centrally reinforced, if desired designed with radial ribs and a circular rib. This facilitates better absorption of tensile forces, which upon rebound act on the plunger piston system via the described central screw connection between air spring bellow and plunger piston or supporting member on the base plate of the plunger piston or the base plate of the supporting member.

A good transfer of forces can be obtained if the upper side of the base plate, with a ring region enclosing its opening, is braced at the level under side of the trough base of the plunger piston, in any case in this ring region.

Furthermore, it is especially advantageous if between the under side of the trough base and the upper side of the base plate there is a shallow cavity that encloses the opening and in whose region the base plate is designed for compression subject to the action of the bolt. This can be achieved, for example, in that with respect to the essentially level trough base the base plate of the supporting member is slightly arched towards the bottom. If plunger piston and supporting member are connected by means of a bolt, guided through the opening provided at this point, and a rubber buffer, then the base plate can be readily compressed. If the bolt is screwed firmly until impact, the base plate in the region of the cavity, however, remains flexible. Thus the parts are clamped together; however, the air spring bellows with the hole for fastening in the upper steel plate and the air connection can be radially twisted now as before via the plunger piston. This results in a greater ease of construction and assembly because it is easier to adapt to the specific pecularities of the vehicle in question without having to disconnect and then tighten the parts.

A maximum guarantee against tearing out the base plate of the supporting member subject to pull is attained if the under side of the base plate of the supporting member transforms from an arc with a large radius into the inner surface of the conical shell of the supporting member. The annular cross-sectional surface of the shell of the supporting member is preferably constant at every height of the truncated conical supporting member so that with little material costs the largest possible transfer of pressure and tensile forces can occur.

This can be accomplished essentially in that the inner surface of the supporting member shell is sloped more with respect to the vertical line than the outer surface of the supporting member shell.

Furthermore, it is proposed with the invention that for production reasons the plunger piston skirt is sloped less with respect to the vertical line over a significant section of its length and widens conically in its bottom foot region outwardly in an arc having a large radius. By expanding the plunger piston in the bottom region, the effective area of the air spring bellows enlarges when the plunger piston plunges correspondingly far. In this manner a hard stroke (for example during complete deflection) against the rubber buffer is avoided.

Other goals, features, advantages and application possibilities of the present invention result from the following description of the embodiments with the aid of the drawing. All described and/or illustrated features by themselves or in any logical combination form the object of the present invention, also independently of their summary in the claims or their references.

FIG. 2 is a fragmentary view, as seen from direction A of FIG. 2b, of a plunger piston system of the invention.

FIG. 2b is a vertical view taken along line BB of FIG. 2a, and

Figure 1:
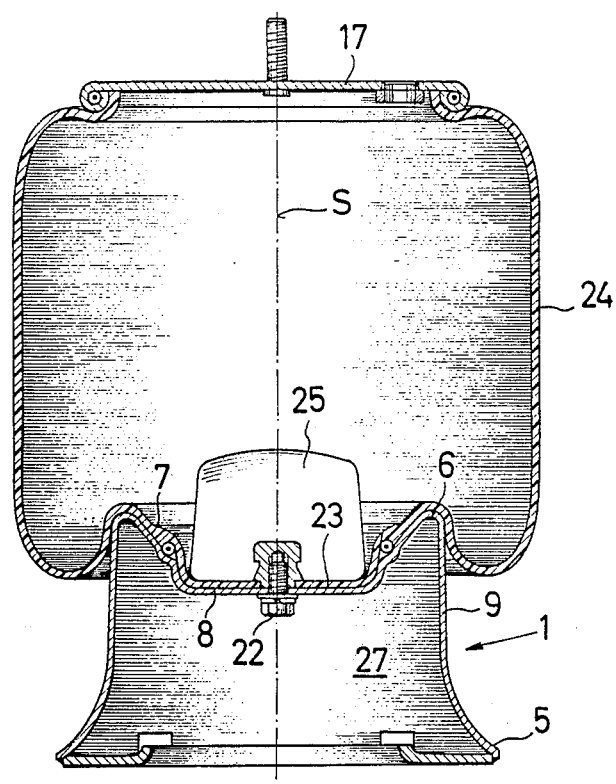
FIG. 1 is a vertical view of a complete air spring bellows with a plunger piston designed as a deepdrawn sheet metal member.

The air spring, accordng to FIG. 1, has an air spring bellows 24 that is designed as a rotationally symmetrical rubber sack and can be filled with air and which is to be connected to a (not illustrated) vehicle frame by means of an upper flanged steel plate 17 as a force transfer element. Vulcanized to the under side of the air spring bellows 24 is a round steel base 23, which carries a rubber buffer 25 as a stop towards the cavity of the air spring bellows 24. The base 23 is designed convex on its under side and lies form-locking in a corresponding concave upper trough base of a plunger piston 1 and is screwed in a friction locking manner together with said piston by means of a bolt 22. The plunger piston 1 is a pot-shaped, rotationally symmetrical deepdrawn steel part. The essentially cylindrical plunger piston skirt 9 is shaped slightly conically outwardly in the bottom foot region 5 and then flanged semi-circularly inwardly. Holes in the flanged edge enable a connection to the plate-shaped end of a (not illustrated) air spring support arm.

Figure 2A:
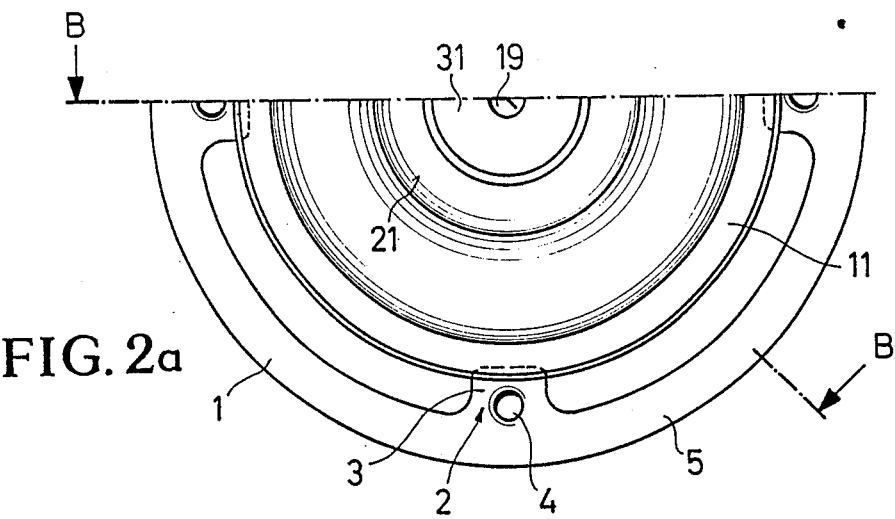
Figure 2B:
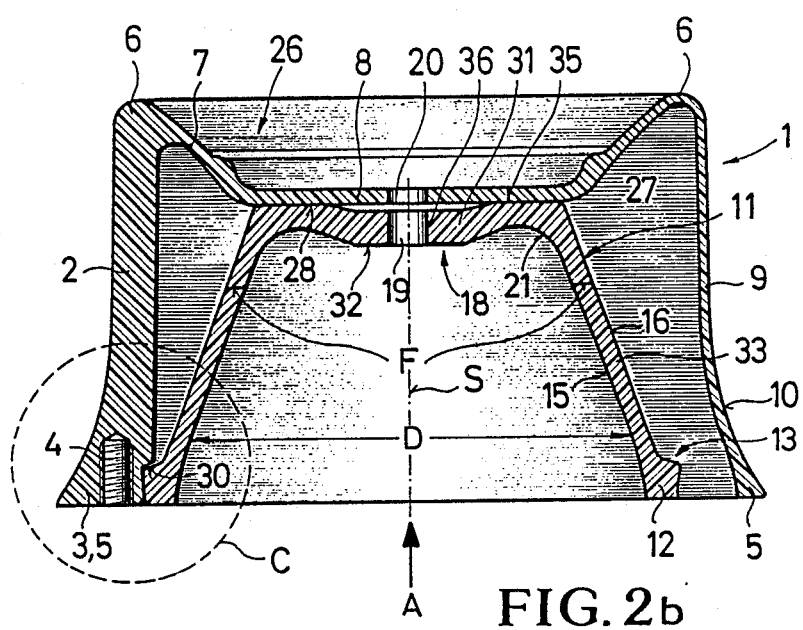
Figure 2C:
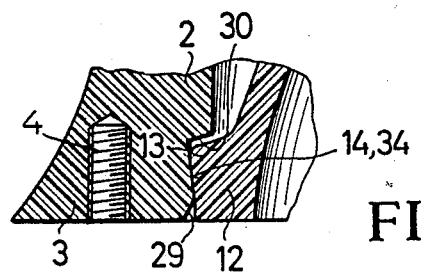
FIG. 2c is an enlarged view of section C of FIG. 2b.

The plunger piston system of the invention, illustrated in FIGS. 2a to 2c, is for application with an air spring bellows system 17, 23, 24, 25 that is designed essentially in the same manner. The outer plunger piston 1 has four 90° apart reinforcing ribs 2, projecting radially inwardly. Threaded hollows 4 are in the foot region 3 of the reinforcing ribs 2 to receive the (not illustrated) tapped bolts in order to connect with the (not illustrated) bearing arm plate. The essentially cylindrical plunger piston sheel 9 transforms at the top into a rounded-off plunger piston edge 6 to which from the outside to the inside an essentially truncated conical trough section 7 is connected with an essentially level trough base 8. The plunger piston skirt 9 is slightly sloped (1°) with respect to the vertical line S and expands in its bottom foot region 5 in the shape of a cone outwardly in an arc 10 having a large radius (100 mm).

A hollow truncated conical supporting member 11 is positioned in the cavity of the plunger piston 1. Its annular foot region 12 has on its outside a stop ribs 13, which can engage with corresponding notched recesses 14 on the inside of the foot region 3 of the four reinforcing ribs 2. For this purpose the notched recesses 14 have, as seen from below, a lead-in slope 29, which transforms into a slight undercut to which in turn at the top a stop edge 30 for the upper side of the stop rib 13 connects. In this manner the two parts—plunger piston 1 and supporting member 11 can be permanently connected. The slope of the inner surface 15 of the supporting member shell 33 is so much larger with respect to the slope of its outer surface 16 that at every altitude of the truncated conical supporting member 11 the annular cross-sectional area F of the supporting member 11 remains constant. The upper base plate 18, into which the supporting member shell 33 transforms, abuts with its level upper side 35 in a ring region firmly a similarly level ring region of the under side 28 of the trough base 8 of the plunger piston 1. The base plate 18 has a coaxial opening 19 towards the opening 20 of the trough base 8 through which the bolt 22, which is not illustrated here, can be guided for a joint connection of both parts of the two part plunger piston system with the base 23 of the air spring bellows 24. The base plate 18 is constructed concavely and flexible in the vicinity of the opening 19 so that a shallow cavity 36 in the direction of the trough base 8 remains free, which decreases somewhat when a bolt 22 (as in FIG. 1) is tightened in the rubber buffer 25 up to the base. The trough 26, enclosed by the trough section 7, in the upper region of the outer plunger piston 1 and the supporting member 11 form a kind of double cone through the level annular seat between the outer plunger piston 1 and the supporting member 11 in its cavity 27. The outer plunger piston 1 and the supporting member 11 connect form-locking by means of the flanged-shaped snap device 13, 14.

To improve the absorption of tensile forces, which during rebounding on the plunger piston apparatus via the described central bolting up between the air spring bellows 24 and the plunger piston 1 or the supporting member 11 on the trough base 8 or the base plate 18, the latter has a reinforcement 31 in the central region. The under side 32 of the base plate 18 transforms from an arc 29 with relatively large radius into the inner surface of the truncated conical supporting member shell 33. This maximally guarantees that the base plate 18 will not be torn out due to pull.

We claim:

1. A plunger piston system for supporting and guiding a pneumatic spring bellows, said plunger piston system comprising:
   a plastic plunger piston, said plunger piston having a downwardly opening pot-like shape with a substantially cylindrical skirt at a central portion thereof, a lower foot region at the bottom portion thereof, and an upper edge adjoining the skirt at an upper portion thereof;
   means on said lower foot region for attaching said plunger piston system;
   a trough base being located at an upper central portion of said plunger piston, an upwardly radially outwardly extending trough section integrally connecting said trough base to said upper edge to said skirt, and said trough base and said upwardly radially outwardly extending trough section jointly defining a trough for receiving a lower portion of the pneumatic spring bellows;

a plastic supporting member, said plastic supporting member having a downwardly substantially truncated cone-like shape and being a separate part of said plunger piston system from said plunger piston, a central portion thereof being downwardly and outwardly sloping, a lower supporting foot region at the bottom portion thereof, and an upper base plate adjoining said central portion at the top thereof, said plastic supporting member being received within a cavity defined by said cylindrical skirt of said plunger piston, said upper base plate of said supporting member contacting and supporting the underside of the trough base of said plunger piston, and said supporting foot region of said supporting member contacting and supporting said foot region of said plunger piston; and means on said trough base of said plunger piston and on said upper base plate of said supporting member for attaching said trough base and said upper base plate to the pneumatic spring bellows when the pneumatic spring bellows is received in said trough.

2. A plunger piston system as in claim 1, wherein each one of said plunger piston and said supporting member has a plurality of contact points defined on their respective foot regions and distributed over the perimeter of the respective foot regions for abutting contact.

3. A plunger piston system as in claim 1, wherein at least one of said plunger piston and said supporting member is a composite plastic material.

4. A plunger piston system as in claim 3, wherein at least one of said plunger piston and said supporting member is a glass fiber-reinforced plastic material.

5. A plunger piston system as in claim 1, wherein said trough base of said plunger piston is level over at least a portion thereof.

6. A plunger piston system as in claim 1, wherein said supporting member is substantially rotationally symmetric and coaxially mounted with said plunger piston.

7. A plunger piston system as in claim 1, wherein said plunger piston has a plurality of reinforcing ribs projecting inwardly and distributed over the perimeter of said plunger piston skirt, said means on said lower foot region of said plunger piston for releasably attaching said plunger piston system includes threaded holes in said lower foot region, and said supporting member foot region connects form-locking with said plurality of reinforcing ribs at lower portions thereof.

8. A plunger piston system as in claim 1, wherein said supporting member has a stop rib at its lower foot region for engaging in the manner of a snap lock with a plurality of notched recesses distributed over the perimeter of said foot region of said plunger piston.

9. A plunger piston system as in claim 8, wherein said stop rib is substantially circular.

10. A plunger piston system as in claim 9, wherein each one of said plurality of notched recesses has an upper stop edge for receiving said substantially circular stop rib.

11. A plunger piston system as in claim 8, wherein said plurality of notched recesses is provided in said plurality of reinforcing ribs in said foot region.

12. A plunger piston system as in claim 8, wherein each one of said plurality of notched recesses further includes undercut portions as viewed from below.

13. A plunger piston as in claim 8, wherein each one of said plurality of notched recesses has a lead-in slope.

14. A plunger piston system as in claim 1, wherein said means on said upper base plate of said supporting member has an opening coaxially aligned with an opening in said trough base of said plunger piston for jointly receiving a bolt therethrough for connecting the pneumatic spring bellows with said plunger piston and said supporting member.

15. A plunger piston system as in claim 13, wherein the upper side of said base plate of said supporting member has a substantially level ring region enclosing said opning in said base plate, said trough base of said plunger piston is substantially level, and said ring region supports said trough base substantially level.

16. A plunger piston system as in claim 13, wherein a gap is left free between the underside of said trough base and the upper side of said base plate of the supporting member for causing in the vicinity of said gap the base plate of the supporting member to be elastically subject to the action of a bolt received in said trough base opening and said base plate opening.

17. A plunger piston system as in claim 1, wherein said base plate of said supporting member has a central reinforcement with a circular rib.

18. A plunger piston system as in claim 1, wherein the underside of said base plate of said supporting member transforms from an arc having a large radius into an inner surface of a conical supporting member shell.

19. A plunger piston system as in claim 18, wherein the cross-sectional area of said supporting member shell is substantially equal at every height of said substantially truncated cone-like supporting member.

20. A plunger piston system as in claim 19, wherein said inner surface of said supporting member shell is sloped more with respect to a vertical axis than is the outer surface of said supporting member shell.

21. A plunger piston system as in claim 1, wherein over a substantial portion of its length said plunger piston skirt has less of a slope with respect to a vertical axis and expands in the shape of a cone outwardly in an arc having a radius larger than any other upper radius of said plunger piston skirt.

* * * * *